US008275228B2

(12) United States Patent
Livingston et al.

(10) Patent No.: US 8,275,228 B2
(45) Date of Patent: Sep. 25, 2012

(54) NETWORK INTERFACE UNIT FOR MODULAR FURNITURE

(75) Inventors: Joseph C Livingston, Frisco, TX (US); David Hall, Hickory, NC (US); Richard L Case, Omaha, NE (US); Ron Mudd, Coppell, TX (US); Kevin M. Gleason, Ijamsville, MD (US)

(73) Assignee: CommScope, Inc. of North Carolina, Hickory, NC (US)

( * ) Notice: Subject to any disclaimer, the term of this patent is extended or adjusted under 35 U.S.C. 154(b) by 522 days.

(21) Appl. No.: 12/606,784

(22) Filed: Oct. 27, 2009

(65) Prior Publication Data

US 2010/0104278 A1 Apr. 29, 2010

Related U.S. Application Data

(60) Provisional application No. 61/109,133, filed on Oct. 28, 2008, provisional application No. 61/111,549, filed on Nov. 5, 2008.

(51) Int. Cl.
*G02B 6/46* (2006.01)
*G02B 6/36* (2006.01)
*H04B 10/24* (2006.01)

(52) U.S. Cl. ............ 385/134; 385/135; 385/53; 398/41

(58) Field of Classification Search .................. 385/134, 385/135, 53, 115, 116, 136, 137, 24; 398/41
See application file for complete search history.

(56) References Cited

U.S. PATENT DOCUMENTS

| 5,149,277 | A | * | 9/1992 | LeMaster | 439/207 |
| 5,326,934 | A | * | 7/1994 | LeMaster et al. | 174/59 |
| 5,593,317 | A | | 1/1997 | Humbles | |
| 6,133,845 | A | | 10/2000 | Toms et al. | |
| 6,248,663 | B1 | * | 6/2001 | Bixler et al. | 438/638 |
| 6,796,716 | B1 | * | 9/2004 | Handforth et al. | 385/53 |
| 7,171,121 | B1 | * | 1/2007 | Skarica et al. | 398/67 |
| 7,482,536 | B2 | * | 1/2009 | Marquardt | 174/60 |
| 2004/0020232 | A1 | * | 2/2004 | Marquardt | 62/259.2 |
| 2010/0104278 | A1 | * | 4/2010 | Livingston et al. | 398/41 |

OTHER PUBLICATIONS

Vectra Plug-N-Play, Form No. 30302, Copyright 2003, Vectra, A Steelcase Company, 1800 South Great Southwest Parkway, Grand Prairie, Texas, 75051, www.vectra.com.

* cited by examiner

*Primary Examiner* — Brian Healy
(74) *Attorney, Agent, or Firm* — Muncy, Geissler, Olds & Lowe, PLLC

(57) ABSTRACT

A network interface unit (NIU) for a modular workstation includes a housing. One or more input network adapters on the housing receive input connectors of a first multi-network cable that is connected to a distribution network. One or more output network adapters on the housing receive output connectors of a second multi-network cable that is connected to another NIU of another modular workstation to provide for a daisy chain connection. One or more workstation adapters are provided on the housing for providing connections to one or more networks of various security levels. Cables that are connected to one or more CPUs or telephones of the workstation are connected to respective ones of the workstation adapters. The workstation adapters of the NIU may provide one or more of visual, physical, and geographical verification and segregation of the network connections to enhance the integrity of the security of the various networks available at the NIU.

20 Claims, 11 Drawing Sheets

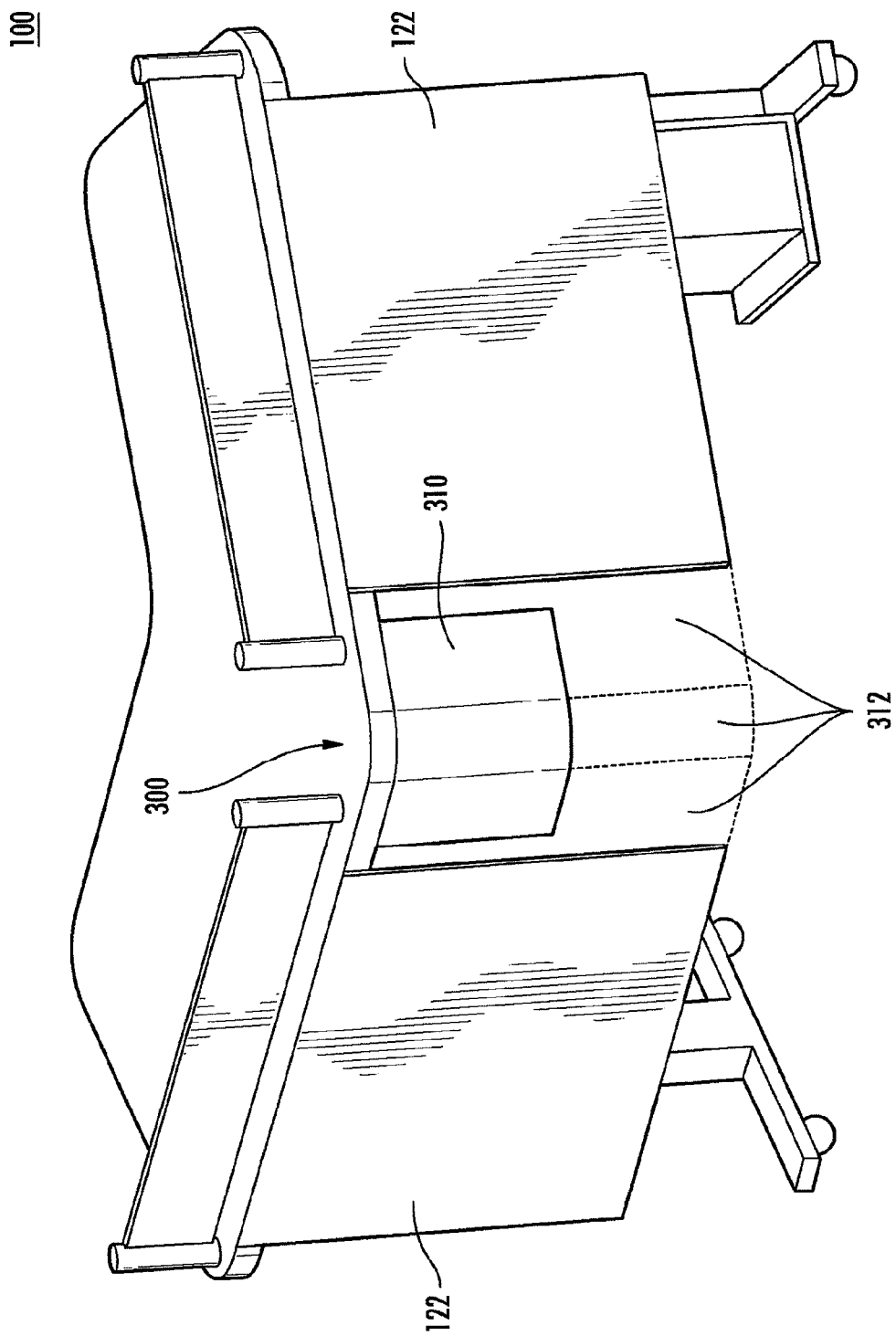

NETWORK INTERFACE UNIT FOR MODULAR FURNITURE

CLAIM OF PRIORITY UNDER 35 U.S.C. §119

The present invention claims the benefit of Provisional Application No. 61/109,133 entitled "NETWORK INTERFACE UNIT FOR MODULAR FURNITURE" filed Oct. 28, 2008, and Provisional Application No. 61/111,549 entitled "NETWORK INTERFACE UNIT FOR MODULAR FURNITURE" filed Nov. 5, 2008, the entire contents of both applications are hereby incorporated by reference.

FIELD OF THE INVENTION

The present invention is directed toward a network interface unit, and more specifically, to a network interface unit for modular furniture.

BACKGROUND OF THE INVENTION

Conventionally, many facilities, businesses, or offices have modular furniture that can be configured in a variety of arrangements to suit a particular need. The modular furniture can be configured to provide a workstation. Each workstation may have one or more CPU's and telephones that require access to one or more computer networks or telephone networks. Commonly, each CPU and telephone at each modular workstation is connected by network cables to a floor, wall, or ceiling hub or distribution network. A floor, wall, or ceiling hub commonly is provided for each workstation. The network cables may include one or more of fiber optic cables, twisted pair cables, or coaxial cables, etc. The number of cables and types of cables may vary depending on the number of CPU's or telephones at each workstation.

In some workstations, it is desirable to connect different CPU's or telephones to different networks. For example, each CPU may require connection to a network having a different level of security, such as top secret, classified or restricted access, and general or public access. Similarly, each telephone may require connection to a network having a different level of security. It is desirable that the physical connection of each CPU or telephone to the corresponding network be properly and correctly made to ensure the integrity of each network and maintain the desired level of security. It also is desirable to reduce the complexity of the network wires supplied to the workstations, and more particularly, to a cluster of modular workstations.

SUMMARY OF THE INVENTION

These problems and others are addressed by the present invention, a first aspect of which comprises a network interface unit for a modular workstation, the network interface unit including a housing, an input network adapter on the housing that receives an input connector of a multi-fiber cable that is connected to a distribution network, a workstation distribution point, having a network adapter, on the housing that receives a connector of a fiber cable that is connected to a device of the workstation, and an interior multi-fiber cable having a first end connected to the input network adapter, wherein a second end of the interior multi-fiber cable is routed and connected to the workstation distribution point.

Another aspect of the invention comprises a network interface unit for a modular workstation, the network interface unit including a housing, one or more input network adapters on the housing that receive input connectors of a multi-fiber cable that is connected to a distribution network, one or more distribution points, each having network adapters, on the housing that receive fiber cables that are connected to one or more CPU's of the workstation, and one or more interior multi-fiber cables connected to the one or more input network adapters on a first end. A range of at least one pair of fibers of a second end of the one or more interior multi-fiber cables is routed and connected to a single distribution point and up to all of the fibers of the second end of the interior multi-fiber cable are routed and connected to the single distribution point.

In another aspect, the NIU provides one or more of visual, physical, and geographical verification and segregation of network connections.

Another aspect of the invention comprises a modular furniture unit having a network interface unit.

Another aspect of the invention comprises a method of providing verification and segregation of network connections of a modular workstation. The method includes mounting a network interface unit on the modular workstation, wherein the network interface unit includes a housing, an input network adapter on the housing that receives an input connector of a multi-fiber cable that is connected to a distribution network, a workstation distribution point, having a network adapter, on the housing that receives a connector of a fiber cable that is connected to a device of the workstation, and an interior multi-fiber cable having a first end connected to the input network adapter, wherein a second end of the interior multi-fiber cable is routed and connected to the workstation distribution point, connecting the input connector of the multi-fiber cable to the input network adapter on the housing of the network interface unit, and connecting the connector of the fiber cable, which is connected to the device of the workstation, to the network adapter of the workstation distribution point of the network interface unit.

Another aspect of the invention comprises a method of linking furniture units for network communication, the method including mounting a network interface unit on a first furniture unit and a second furniture unit, connecting a first network interface unit of the first furniture unit to a distribution network, and connecting a second network interface unit of the second furniture unit to the first network interface unit of the first furniture unit.

BRIEF DESCRIPTION OF THE DRAWINGS

These and other aspects and features of embodiments of the present invention will be better understood after a reading of the following detailed description, together with the attached drawings, wherein:

FIG. 3 is a perspective front view of a modular workstation according to another embodiment of the present invention;

DETAILED DESCRIPTION

Figure 1:
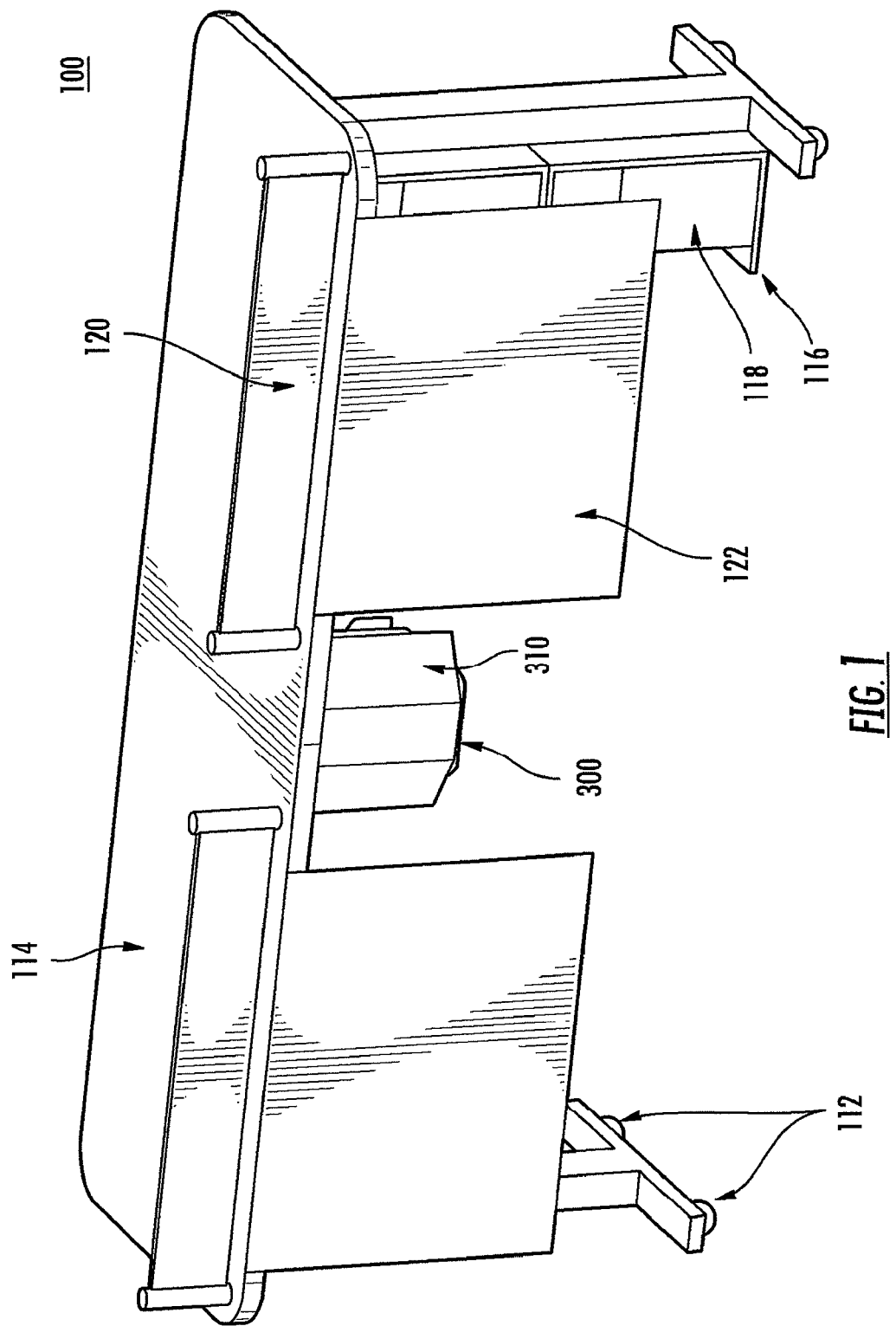
FIG. 1 is a perspective front view of a modular workstation according to an embodiment of the present invention.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Spatially relative terms, such as "under", "below", "lower", "over", "upper", "lateral", "left", "right" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is inverted, elements described as "under" or "beneath" other elements or features would then be oriented "over" the other elements or features. The device may be otherwise oriented (rotated 90 degrees or at other orientations) and the descriptors of relative spatial relationships used herein interpreted accordingly.

Referring now to the drawings, FIG. 1 illustrates an embodiment of a piece of modular furniture, such as a modular workstation 100. A modular workstation 100 may be moveable, or mobile, to provide rapid reconfiguration of the workstation or a cluster of different workstations. The modular workstation 100 may include wheels 112 to facilitate movement of the workstation 100. The modular workstation 100 may include a desktop or work surface 114. The workstation 100 also may include support surfaces or mounting surfaces (not shown) for one or more monitors and telephones. The workstation 100 may include one or more flat screen monitor mounts (not shown) for supporting one or more flat screen monitors. The modular workstation 100 also may include support surfaces or trays 116 (e.g., 116A, 116B, 116C, etc.) for one or more CPU's 118 (e.g., 118A, 118B, 118C, etc.). The workstation 100 may further include organizational features, such as an organizational rail 120 and a privacy screen 122 having organizational storage (e.g., 124).

The modular workstation 100 is not limited to a desk-type workstation, and may include any type of furniture, such as a conference table, a cubicle partition, or a type of auditorium furniture, such as a workstation for a single user or a plurality of users. The workstation 100 is not limited to any particular shape and may be a rectangular workstation (e.g., as exemplarily illustrated in FIG. 1), a 90 degree, 120 degree (e.g., as exemplarily illustrated in FIG. 3), or other angle workstation, a semi-circular workstation, or other shaped workstation. The work station 100 also may include other types of furniture, such as a book case or a type of modular stand alone furniture.

Figure 2A:
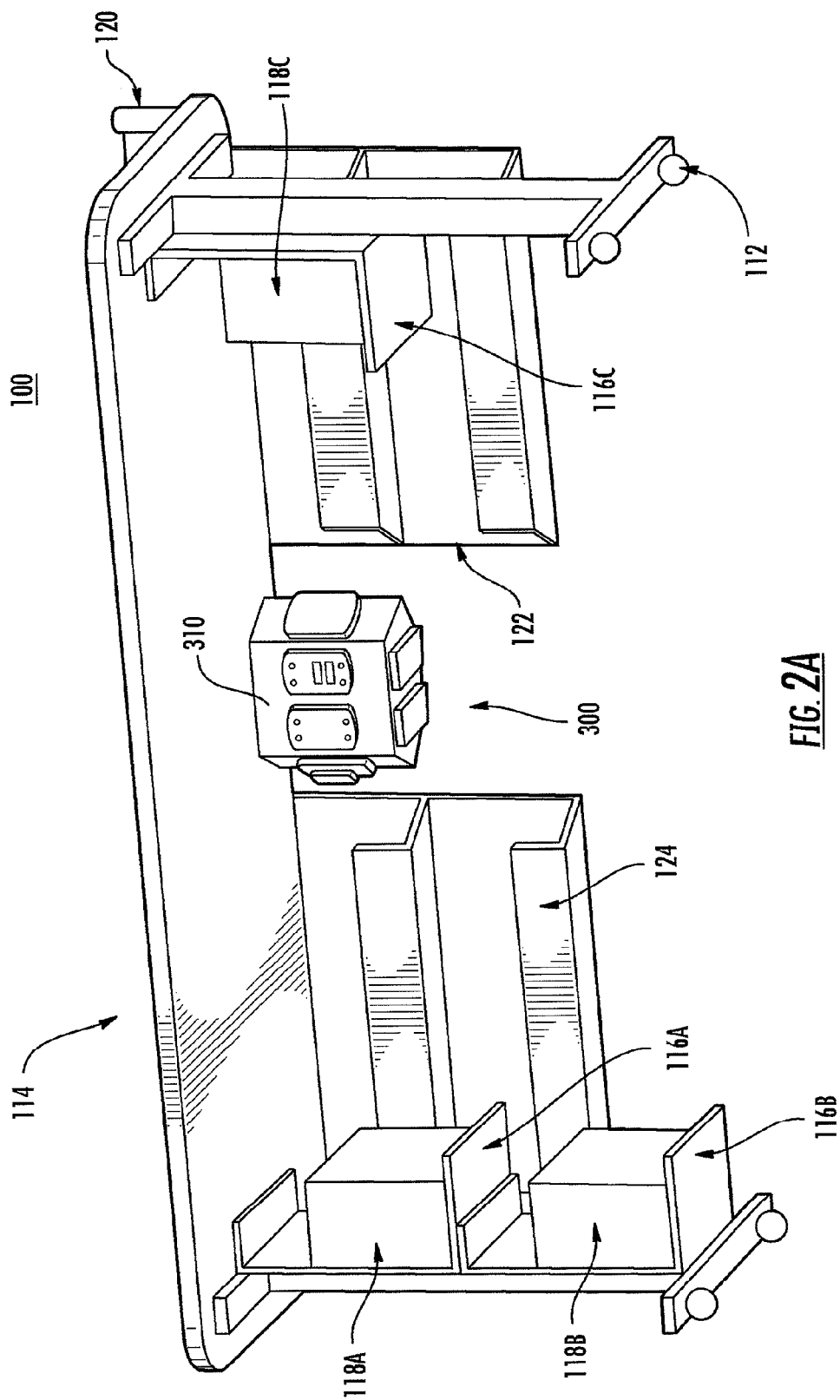
FIGS. 2A and 2B are perspective rear views of a modular workstation according to an embodiment of the present invention.
Figure 2B:
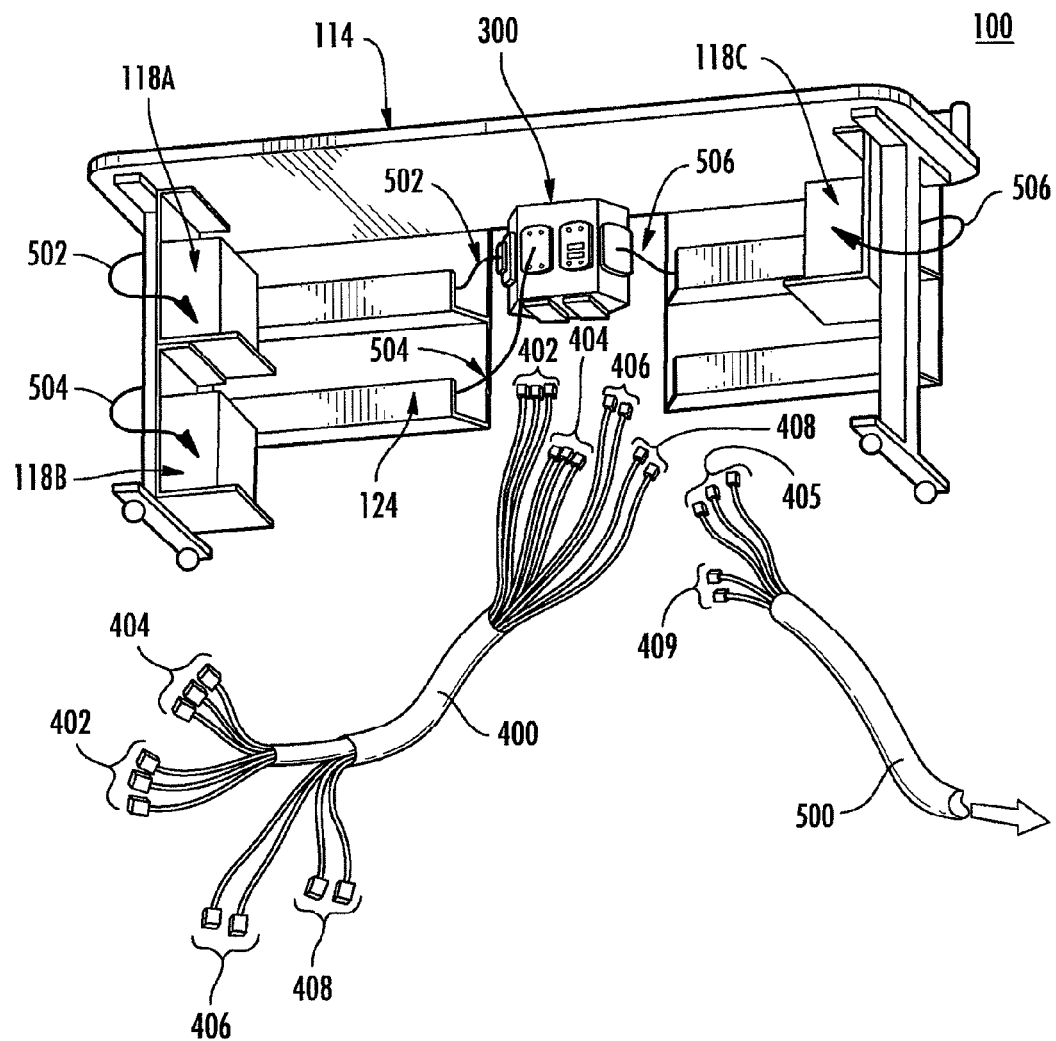

Referring to FIGS. 2A and 2B, the workstation 100 may have mounting surfaces or trays (e.g., 116A, 116B, 116C, etc.) for one or more CPU's (e.g., 118A, 118B, 118C, etc.). The aspect shown in FIGS. 2A and 2B has a tray 116A, B, C for each of a first CPU 118A for Network 1, a second 118B CPU for Network 2, and a third CPU 118C for network 3. The CPU trays 116 can be mounted to a frame of the workstation 100 or suspended from an underside of the work surface 114 of the workstation 100. The number of CPU's 118 is not limited to the aspect shown and may include one or more CPU's. For example, a single workstation may include as many CPU's as may be physically located at, on, or near the modular furniture. The location of each CPU also is not limited to the locations shown in the exemplary aspects.

For example, a CPU can be located in the center of the workstation 100, such as in front of or below the network interface unit (NIU) 300. A CPU also can be located above the work surface 114 of the workstation 100. In another aspect, the workstation can include a "towed-unit", which can include, for example, a wheeled cart attached to the unit that may include one or more CPU's. In an exemplary aspect, one or more CPU's can be disposed on or attached to the bottom of the unit, with an organizational surface, a file cabinet, or other such features disposed on or attached to the top of the unit. For example, in an aspect, a user can have ten (10) CPU's for a given unit.

In an aspect, the workstation 100 also may include channels or troughs, such as J-shaped troughs 124, for organization of cables and components such as network cables, power cables, keyboard cables, monitor cables, etc.

As explained above, it may be desirable to connect different CPU's or telephones to different networks. For example, each CPU may require connection to a network having a different level of security, such as top secret, classified or restricted access, and general or public access. Similarly, each telephone may require connection to a network having a different level of security. To solve the problems with the prior art, aspects of the invention provide a network interface unit (NIU) 300 that improves or ensures that the physical connection of each CPU or telephone to the corresponding network is properly and correctly made, thereby improving or ensuring the integrity of each network and maintaining the desired level of security. The exemplary aspects of the NIU 300 integrate network distribution of zone wiring into the modular furniture for simple and easy reconfiguration. The aspects also provide secure network segregation. The aspects provide a structured cabling architecture that facilitates and improves accurate connections of different CPUs and telephones to network cables of respective networks, thereby reducing a risk of cross-connections between networks.

Referring again to FIG. 1, a network interface unit (NIU) 300 may be coupled to the modular workstation 100. The NIU 300 can be secured to the workstation 100, for example, by bolting or fastening the NIU to the workstation, or by hanging the NIU 300 on the workstation 100. The NIU 300 also can be integrally formed with the workstation 100.

Referring to FIG. 1, a shape of an enclosure or housing 310 of the NIU 300 may correspond to the shape of the modular workstation 100, which may improve or maximize the use of space for the workstation 100. For example, the enclosure or housing 310 of the NIU 300 may be angled or curved to match the surface, or style, of the front face of the modular furniture, as exemplarily illustrated in FIG. 3. The shape of the enclosure or housing 310 may be selected to efficiently make use of the mounting space in the modular furniture. By providing the NIU 300 with the same or similar shape as the furniture, the NIU 300 also may blend in with the furniture, which may be visibly desirable to the user. A portion 312 (shown in dashed lines in FIG. 3) of an enclosure or housing 310 of the NIU 300 may extend downward to match the adjacent privacy screens 122 of the workstation 100. The enclosure 310 of the NIU 300 may have integrated organizational features, such as one or more channels or troughs, such as J-shaped troughs.

The shape of the NIU 300 is not limited to the aspect shown in the drawings. For example, the shape of the NIU 300 may be rectangular-, octagonal-, or hexagonal-shaped. The shape of the NIU 300 also may be other suitable shapes, such as a curved or cylindrical shape.

The NIU 300 may have a plurality of faces or mounting surfaces (e.g., 314, 316, 318, 320, 322). The NIU 300 may have one or more network interfaces, such as faceplates (e.g., 324, 326, 328, 330, 332, 334) or similar physical devices, on one or more surfaces (e.g., 314, 316, 318, 320, 322) to provide retention of individual connectors and/or adapters. The NIU 300, illustrated for example in FIG. 4, has a 6-port face plate; however, other face plates may be provided. The retention of the individual connectors and/or adapters also may be done by direct insertion of the cables into mounting holes in the enclosure, or by providing boxes for enclosing the individual connectors and/or adapters. The adapters connect the network cables from each CPU 118 to network cables in the interior of the NIU 300.

Figure 4:
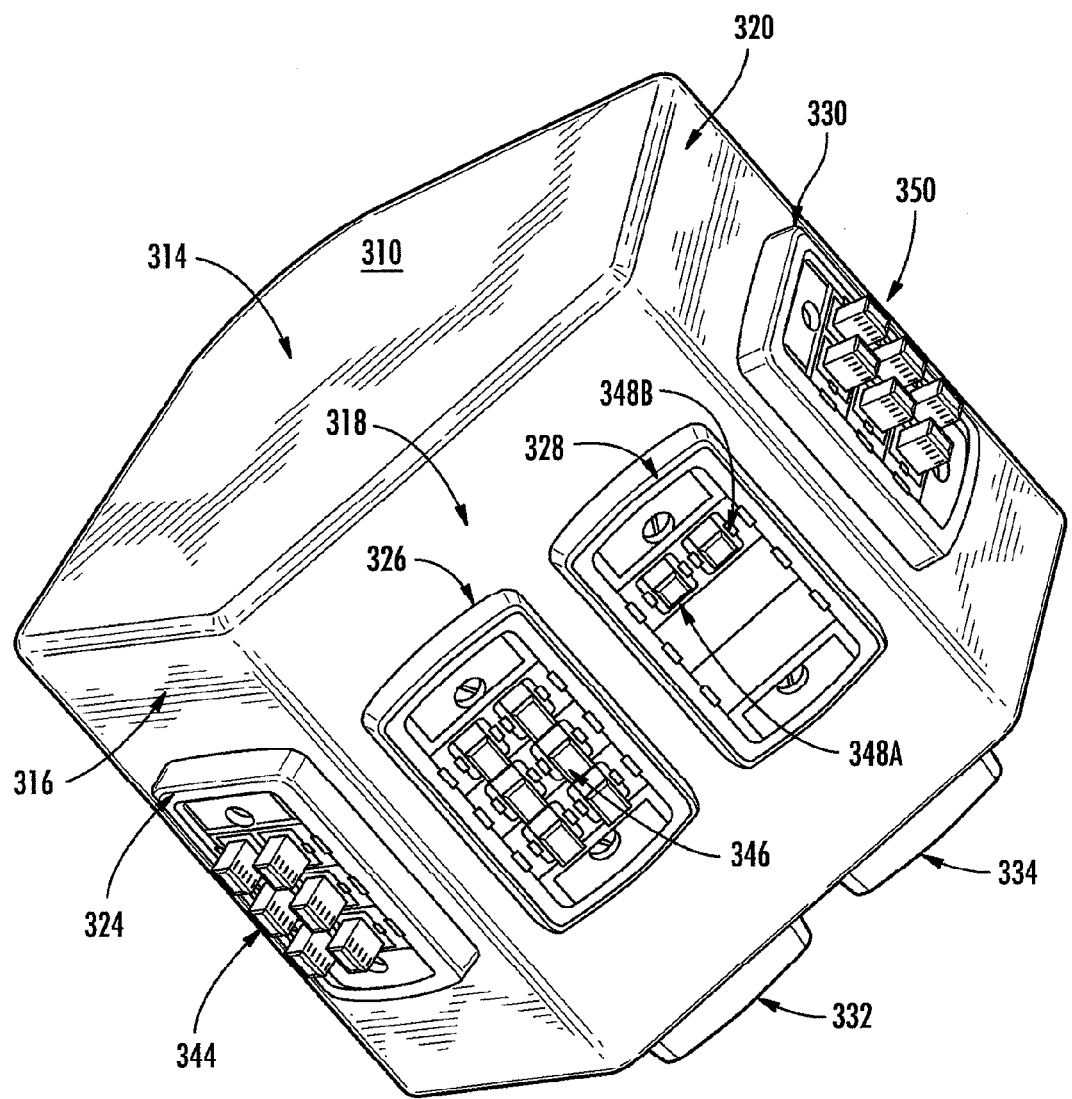
FIG. 4 is a perspective rear view of a network interface unit (NIU) according to an embodiment of the present invention.
Figure 5:
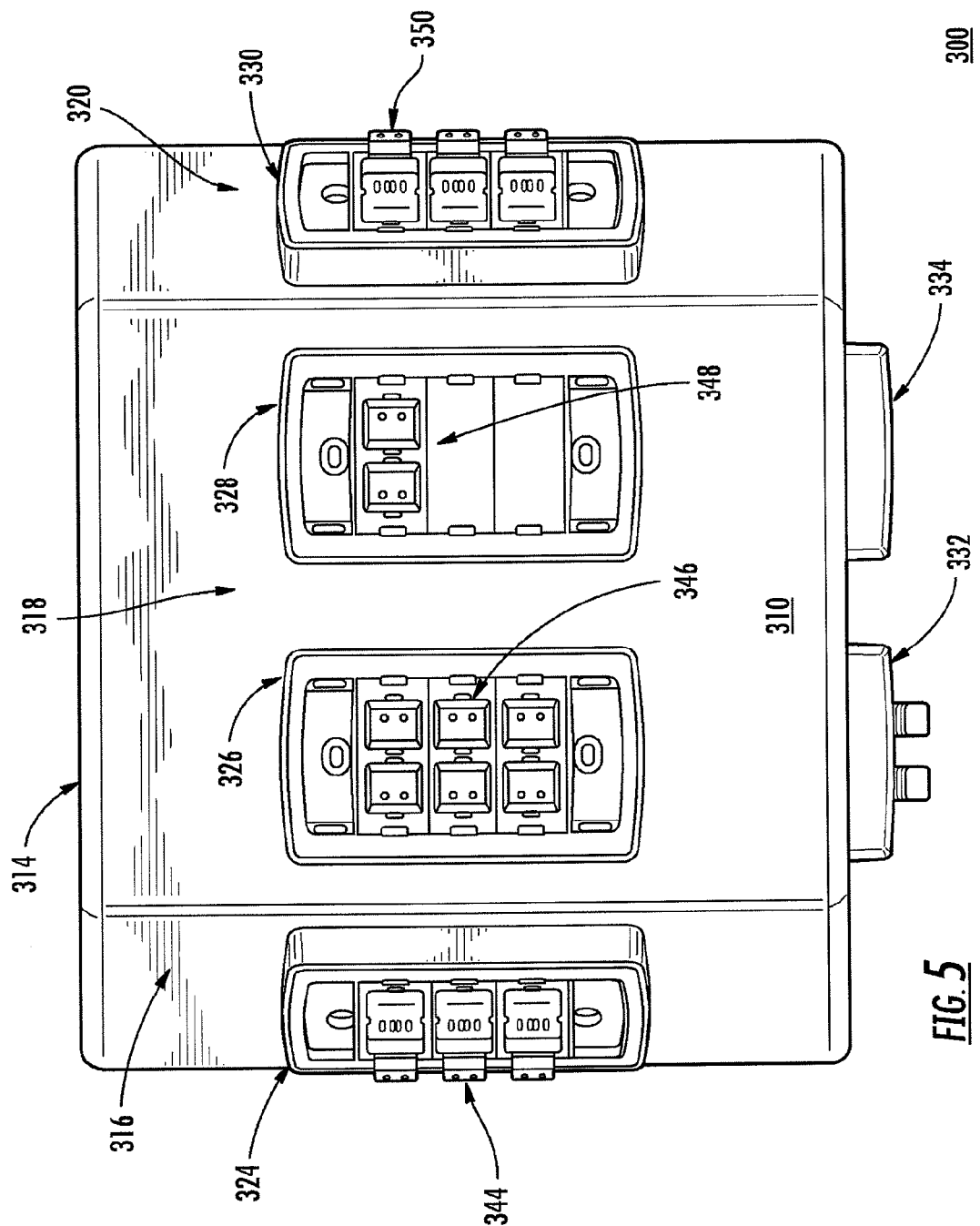
FIG. 5 is a rear elevation of a network interface unit (NIU) according to an embodiment of the present invention.
Figure 6:
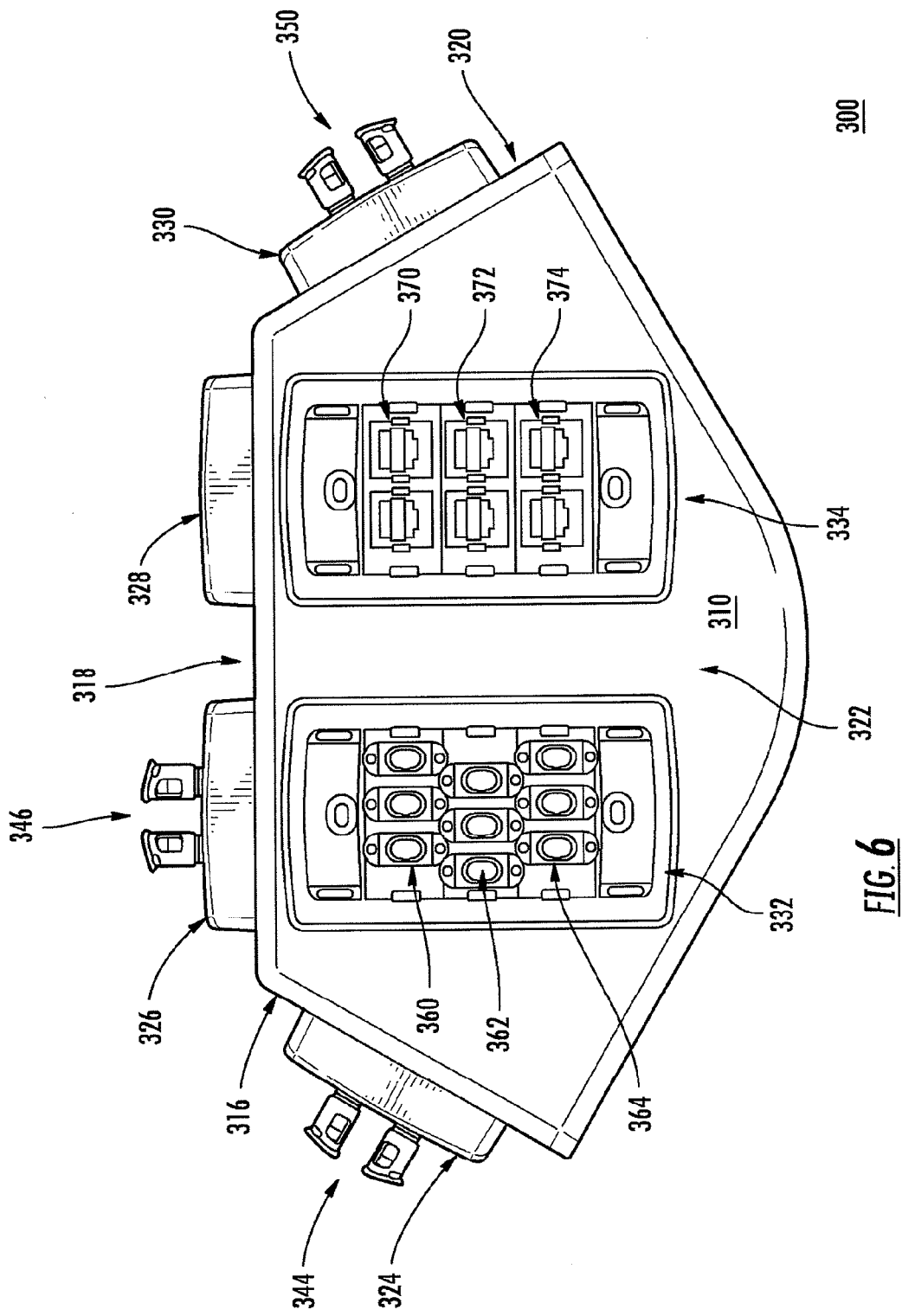
FIG. 6 is a bottom elevation of a network interface unit (NIU) according to an embodiment of the present invention.
Figure 7:
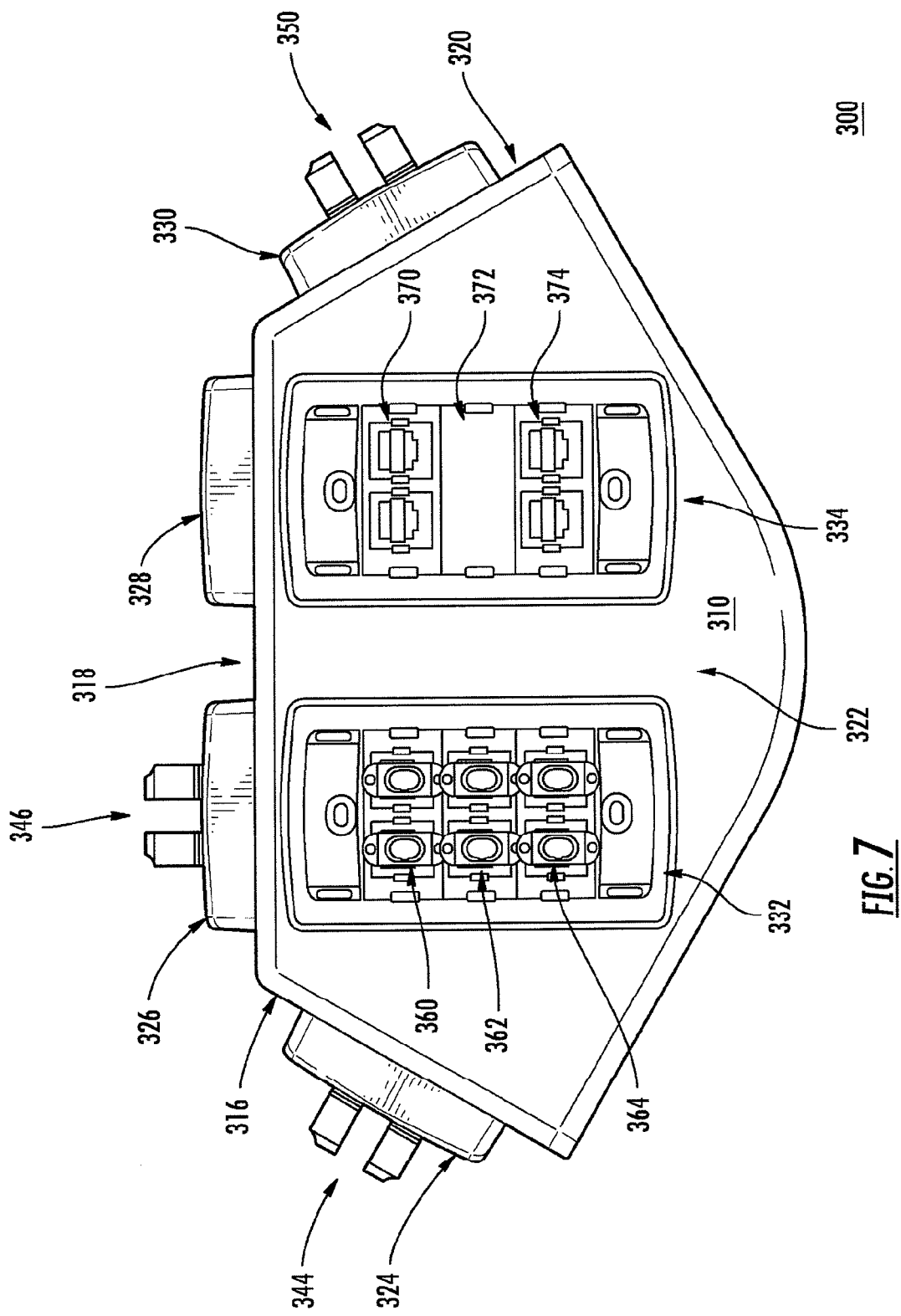
FIG. 7 is a bottom elevation of a network interface unit (NIU) according to another embodiment of the present invention.
Figure 8:
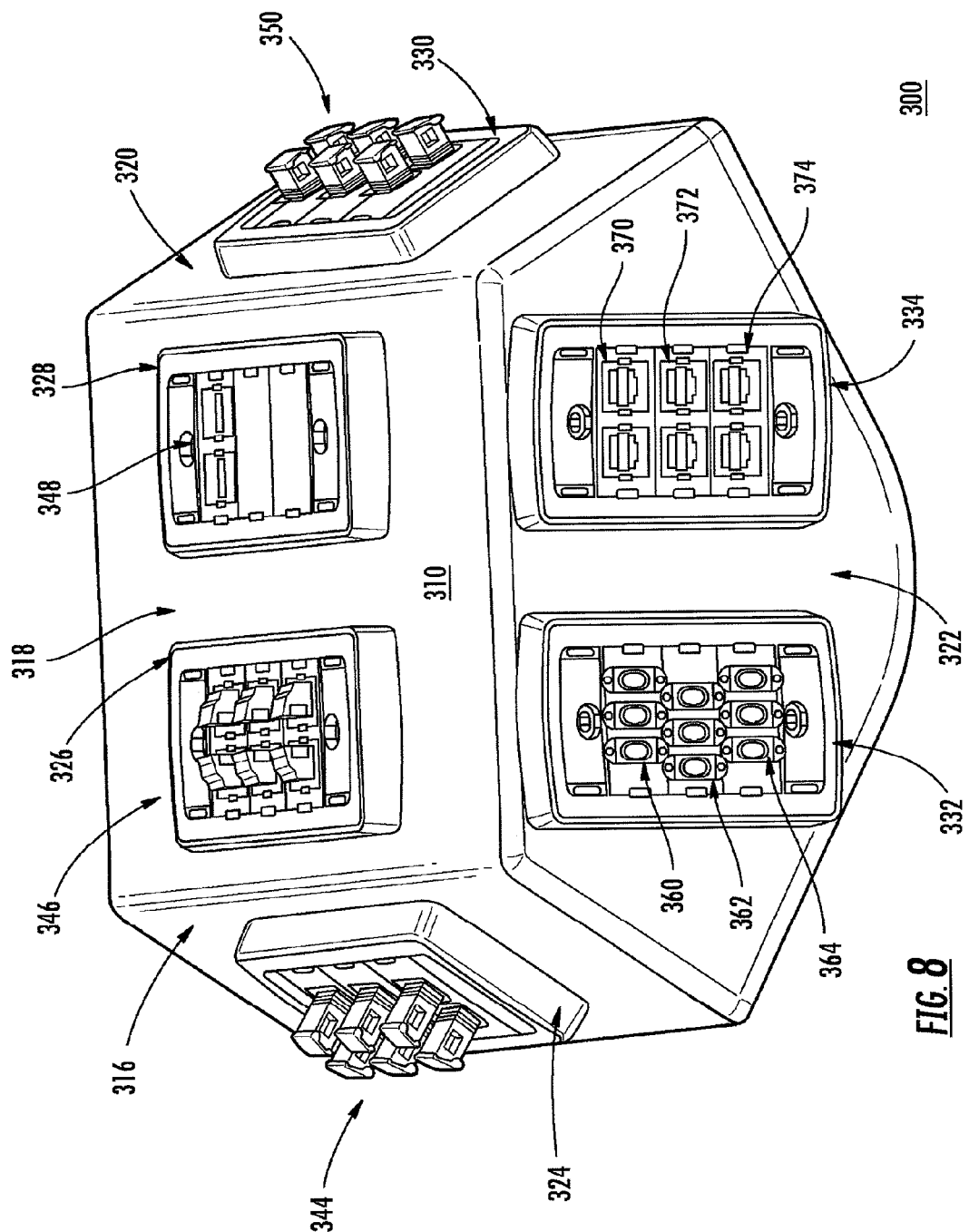
FIG. 8 is a bottom perspective rear view of a network interface unit according to an embodiment of the present invention.

The network interfaces shown in FIGS. 4 and 5 are, from left to right, a fiber optic network 1 interface 344, a fiber optic network 2 interface 346, an STP or UTP data network interface 348, and a fiber optic network 3 interface 350. Referring to FIGS. 6 and 8, the NIU 300 also may include network interface inputs 360 ("IN"), throughputs 362 ("THRU"), and outputs 364 ("OUT") for fiber optic cables 402, 404 and 405 (see FIG. 2B) and network interface inputs 370 ("IN"), throughputs 372 ("THRU"), and outputs 374 ("OUT") for copper cables 406, 408 and 409 (see FIG. 2B). The configuration of the physical devices on the faceplates is not limited to the configurations shown, and may be other configurations, for example, as illustrated in the exemplary aspects of FIGS. 7 and 8 (e.g., 332). The interior configuration of aspects of the NIU 300 will be described in greater detail below.

An aspect of the NIU 300 provides a centralized access point or launch point for network communication to each CPU and/or phone of the modular workstation 100. The NIU 300 also provides one or more verification means for preventing intentional or unintentional misconnects between each CPU and/or telephone of the modular workstation 100 and a corresponding correct network. More particularly, an aspect of the NIU 300 provides one or more of visual, physical, and geographical verification and segregation of network connections. The geographical verification and segregation may include, for example, directional, locational, or distance verification and segregation.

An aspect of the NIU 300 may provide visual verification and segregation of the network connections to reduce or avoid intentional and unintentional misconnection of a CPU or phone to an incorrect network. For example, each CPU 118A, 118B, 118C and corresponding network interface 344, 346, 350 of the NIU 300 may be color coded to correspond to each other. An aspect of the NIU 300 may have one or more of color coded surfaces, faceplates, or adapters. Each cable may have a corresponding color coded connector or jacket for simplifying matching to the corresponding network interface of the NIU 300. Other methods of color coding can be used. For example, in other aspects, a color-coded label can be provided on one or more cables, surfaces, faceplates, adapters, etc. In another aspect, an external appearance method, such as color-coded heat-shrink or a plastic wrap-around housing, can be provided on one or more cables, surfaces, faceplates, adapters, etc. to provide visual assistance in denotation.

For example, a first CPU 118A or its network cables 502 may be designated and color coded red to correspond to a red network interface (e.g., 344) of the NIU 300. A second CPU 318B or its network cables 504 may be designated and color coded yellow to correspond to a yellow network interface (e.g., 346) of the NIU 300. A third CPU 318C or its network cables 506 may be designated and color coded green to correspond to a green network interface 350 of the NIU 300. Similarly, a secure phone may be designated and color coded red to correspond to a red RJ45 adapter (e.g., 348A) of the NIU 300. A public phone may be designated and color coded black to correspond to a black RJ45 adapter (e.g., 348B). The RJ45 adapters may include a locking or a keying feature so that only a secure phone connector can mate with the red adapter 348A and only a public phone connector can mate with the black adapter 348B. For example, the red adapter 348A may have two slots and the black adapter 348B may have two slots in different locations relative to the two slots of the red adapter 348A. By this arrangement, the connector of the secure phone having two keys will not fit into the black adapter 348B and the connector of the public phone having two keys in a different position on the connector will not fit into the red adapter 348A.

The visual verification is not limited to color coding and may include identifying the CPU or phone and its corresponding network cables 502, 504, 506 using one or more symbols that correspond to or match one or more symbols on the corresponding network interface 344, 346, 348, 350 of the NIU 300. Other visual verification means also may be provided, such as matching textures or patterns on the cables, connectors, adapters, or surfaces of the NIU 300, among other things.

Another aspect of the NIU 300 may provide physical verification and segregation of the network connections to reduce or avoid intentional and unintentional misconnection of a CPU or phone to an incorrect network. For example, complimentary physical connector structures (such as slots and protrusions), commonly referred to as keying means, may be provided on the coupling parts of the adapters and connectors, so that each CPU or phone may only be connected to the correct corresponding network interface of the NIU 300. The physical connector structure or keying means may be unique to each CPU and/or phone security level. Alternatively, the connector of a network cable (e.g., 502, 504, 506, etc.) may have a particular connector type that is insertable only into a corresponding adapter type of the NIU 300 for the corresponding correct network interface. For example, the fiber networks may utilize LC connectors for a first network security level and another connector type, such as SC connectors for a second network security level, and even another connector type, such as ST connectors for a third network security level. Of course, the LC, SC and ST connectors could additionally include keying features to provide an added level of security. The STP or UTP data networks may utilize keyed RJ45 twisted pair connectors for shielded and unshielded cables. According to this aspect of the invention physical means are used for achieving network segregation.

A further aspect of the NIU 300 may provide geographical verification and segregation of the network connections to reduce or avoid intentional and unintentional misconnection of a CPU or phone to an incorrect network. The geographical verification and segregation may include, for example, directional, locational, or distance verification and segregation.

The NIU 300 may provide geographical segregation in a number of ways. For example, the NIU 300 may provide geographical segregation of one network from another by isolating each network interface (e.g., 344, 346, 348, 350) for each CPU or phone on a different surface (e.g., 316, 318, 320, 322) of the NIU 300. The NIU 300 also may provide geographical segregation of one network from another by "pointing" each network interface away from each other to avoid unintentional misconnection of a CPU or phone to an incorrect network. The NIU 300 also may provide geographical segregation using a combination of isolating each network interface for each CPU or phone on a different surface (e.g., 316, 318, 320, 322) of the NIU 300 and "pointing" each network interface surface away from each other to avoid unintentional misconnection of a CPU or phone to an incorrect network.

As another example, the NIU 300 may provide geographical segregation by providing fiber cables (e.g., 502, 504, 506) and copper cables (not shown) having a length that corresponds to the location of the respective CPU. For example, a CPU that is located closest to the NIU may have a cable length that is sufficient for connecting only to the network interface closest to or pointed toward the CPU. One or more of the network cables (e.g., 502, 504, 506) may be provided with a length that is only sufficient for coupling the CPU to a corresponding correct network interface and too short for coupling the CPU to a non-corresponding or unauthorized network.

One or more of the aforementioned aspects may be combined to reduce or avoid intentional and unintentional misconnects or cross-connects. For example, the cables (e.g., 502, 504, 506, copper cables (not shown), etc.) may include connectors, such as keyed connectors, that may be connected only to a corresponding adapter and that have limited lengths, thereby making connecting or patching these cables to an incorrect CPU more difficult or impossible. More particularly, the aspects may provide verification and segregation of the network connections to reduce or avoid intentional and unintentional misconnection of a CPU or phone to an incorrect network by utilizing one or more of, or combinations of, visual, physical, and geographical verification and segregation.

Figure 10A:
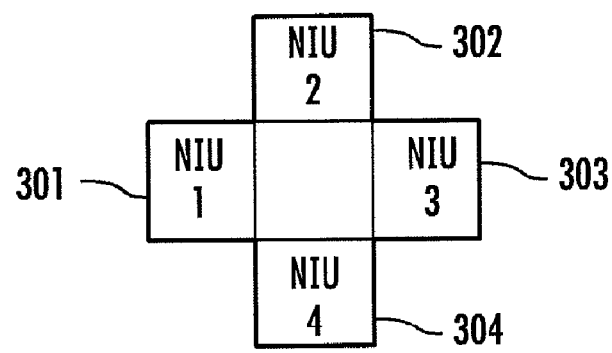
FIGS. 10A and 10B are top elevations of network interface units (NIU's) integrally formed or coupled to one another in an arrangement or cluster.
Figure 10B:
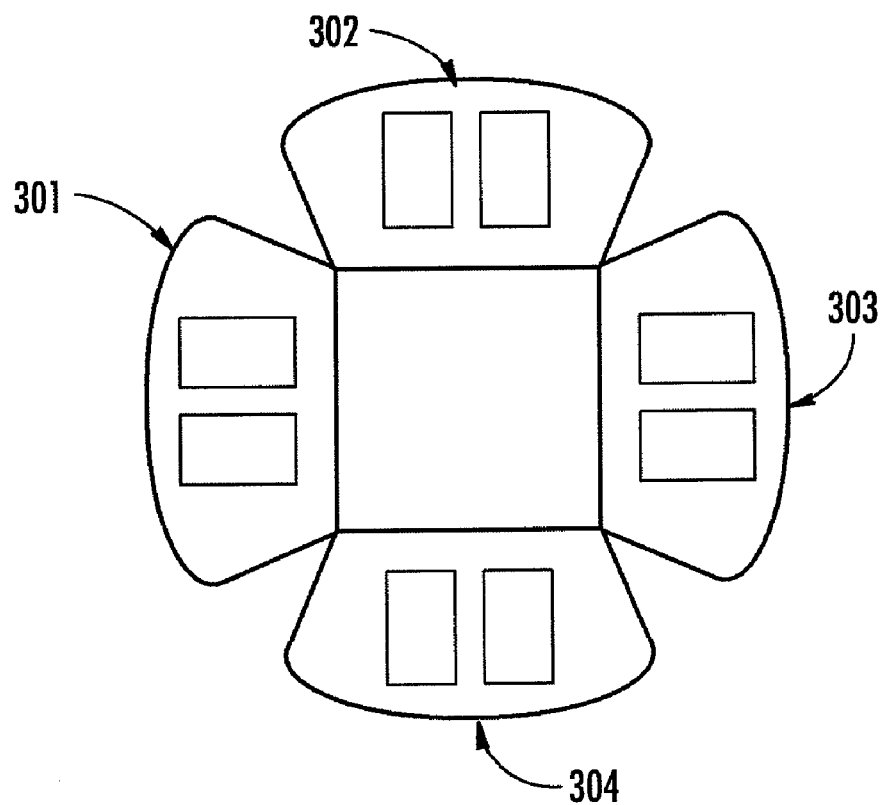

Referring to FIGS. 10A and 10B, another aspect may include one or more network interface units (NIU's) 300 (e.g., 301, 302, 303, 304) integrally formed or coupled to one another in an arrangement or cluster. For example, an aspect may include a cross-shape or t-shape, or the like. The arrangement of NIU's 300 may provide verification and segregation of network connections for one or more workstations 100 arranged or clustered together.

Referring again to FIGS. 1 to 9, exemplary aspects of the NIU 300 and the operation of the NIU 300 will now be described. An exemplary NIU 300 has a fiber optic network 1 interface 344, a fiber optic network 2 interface 346, an STP or UTP data network interface 348, and a fiber optic network 3 interface 350. The NIU 300 also has network interface inputs 360 ("IN"), throughputs 362 ("THRU"), and outputs 364 ("OUT") for fiber optic cables 502, 504, 506 and network interface inputs 370 ("IN"), throughputs 372 ("THRU"), and outputs 374 ("OUT") for copper cables (not shown) on an underside (e.g., surface 322) of the NIU enclosure 310. The "IN" adapters 360 receive "IN" fibers 402 (e.g., from a multi-strand hookup cable 400) for direct usage by the workstation 100. The "THRU" adapters 362 receive "THRU" fibers 404 (from the same multi-strand hookup cable 400 or from a separate cable) for passing through to another workstation, for example, in a daisy-chaining aspect, as described in greater detail below. The "OUT" adapters 364 facilitate connecting the "THRU" fibers 404 to "IN" and/or "THRU" fibers of another multi-fiber cable 500 linked to another workstation.

The multi-strand hookup cable 400 is not limited to the cable illustrated in FIG. 2B and can include any suitable cable, composite cable, or combination of cables, including, for example, fiber optic and/or copper. For example, aspects of the cable 400 can include, among other arrangements, a) a collection of cables loosely held together; b) a collection of individual cables wrapped with a loose covering such as "speed-wrap" or the like; and/or c) an overjacketed, composite cable including subunit cables of fiber and copper. Aspects of the cable 400 also can include a strength member for additional stiffness. The strength member can be disposed, for example, inside the cable or on an exterior of the cable.

Referring to FIG. 2B, in operation, a first CPU 118A may be connected by a first fiber optic cable 502 or multi-fiber cable to the fiber optic network 1 interface 344 of the NIU 300. The second CPU 118B may be connected by a second fiber optic cable 504 or multi-fiber cable to the fiber optic network 2 interface 346 of the NIU 300. The third CPU 118C may be connected by a third fiber optic cable 506 or multi-fiber cable to the fiber optic network 3 interface 350 of the NIU 300. The first, second, and third fiber optic cables 502, 504 and 506 may be secured or organized in the organizational troughs 124 of the modular workstation 100.

Referring again to FIG. 2B, the multi-strand hookup cable 400 may connect the NIU 300 to a floor hub or floor-based distribution network (not shown). In an exemplary aspect, the network distribution to the NIU 300 may be from sub-floor boxes on an 8-ft grid. The network distribution to the NIU 300 also may be from wall-based or ceiling-based hubs or distribution networks. The multi-strand hookup cable 400 may include the "IN" fibers 402, "THRU" fibers 404, "IN" copper conductors 406, and/or "THRU" copper conductors 408. Referring to FIGS. 6-8, the "IN" fibers 402 and "THRU" fibers 404 may have multi-fiber connectors that are coupled to the "IN" and "THRU" adapters (360, 362) on the bottom surface 322 of the NIU 300. A multi-fiber connector, such as an MPO connector, may be used to facilitate rapid deployment and reconfiguration of the workstations. Other multi-fiber connectors with a variety of different fiber counts may be used. The NIU 300 also may accommodate copper interconnects if needed. Accordingly, the "IN" copper 406 and "THRU" copper 408 may be coupled to the "IN" and "THRU" RJ45 adapters 370, 372 on the bottom surface 322 of the NIU 300.

The aspects of the NIU 300 provide a sealed interior space having dedicated fiber cables and copper that connect the "IN" fiber 360 and "IN" copper 370 adapters to the respective adapters for each CPU 118, such as the Red, Yellow, and Green adapters (e.g., top secret, restricted or classified access, and general or public access), and each telephone, such as the Red telephone and Black telephone (e.g., secure and public), on the surfaces of the NIU enclosure 310.

The interior of the NIU 300 may have various arrangements. In an aspect, an interior multi-fiber cable may be provided that breaks out to individual connectors or connector pairs, which may be routed to the respective adapters for each CPU 118. Each individual fiber, or fiber pair, may be dedicated to, and distributed to, a particular CPU 118. The fibers are not split. For a given aspect, at least one pair of fibers of the interior multi-fiber fiber cable may be routed and connected to a single distribution point (e.g., for a CPU 118) and up to all of the fibers of the interior multi-fiber cable may be routed and connected to a single distribution point (e.g., for a CPU).

In an exemplary aspect, an interior multi-fiber cable may have a plurality of fiber connectors (e.g., twelve (12) fiber connectors), such as an MPO connector, that connects to the "IN" adapter 360 of the NIU 300 on a first end of the interior multi-fiber cable. Each interior multi-fiber cable may fan out (or break out) into a plurality of individual connectors (e.g., twelve (12) fibers, or six (6) duplex transmit and receive fiber pairs), such as LC connectors, on a second end of the interior multi-fiber cable. Each of the individual LC connectors may be connected or plugged into the back of a single adapter of a face plate (e.g., 324, 326, 330) for a single CPU (e.g., 118A, 118B, 118C), such as one of the Red, Yellow, or Green CPUs. In this aspect, an interior multi-fiber cable is dedicated to a single network, such as one of the red, yellow, or green networks.

In another exemplary aspect, an interior multi-fiber cable may have a plurality of fiber connectors (e.g., twelve (12) fiber connectors), such as an MPO connector, that connects to the "IN" adapter of the NIU on a first end of the interior multi-fiber cable. Each interior multi-fiber cable may fan out (or break out) into a plurality of individual connectors (e.g., twelve (12) fibers, or six (6) duplex transmit and receive fiber pairs), such as LC connectors, on a second end of the interior multi-fiber cable. In this aspect, the individual LC connectors may be connected or plugged into a plurality adapters of the face plates for a plurality of CPU's at the workstation. For example, at least one transmit and receive pair of fibers (e.g., LC 1, 2, 3, 4) may be connected to an adapter of the first face plate 324 for a first CPU 118A (e.g., a red face plate for a red CPU). At least one transmit and receive pair of fibers (e.g., LC 5, 6, 7, 8) also may be connected to an adapter of the second face plate 326 for a second CPU 118B (e.g., a yellow face plate for a yellow CPU). Further, at least one transmit and receive pair of fibers (e.g., LC 9, 10, 11, 12) may be connected to an adapter of the third face plate 330 for a third CPU 118C (e.g., a green face plate for a green CPU). In this aspect, an interior multi-fiber cable is distributed to a plurality of networks, which may improve scalability of the NIU and reduce costs. Furthermore, it is noted that the inability of fiber signals to bleed or cross-talk allows multi-network trafficking on the same trunk. The sealed network interface unit (NIU) 300 distributes networks to specific locations on the workstation.

In another example, the NIU 300 may include any numbers of fibers (e.g., up to 36 fibers, 72 fibers, etc.) to each workstation 100, with a minimum number of fibers (e.g., 8-fibers) per network (e.g., red-secret, yellow-classified or restricted, and green-public) to be segregated physically on the workstation 100. In an aspect, common MPO InstaPATCH+™ trunks may be utilized with 4-fiber designation that is consistent in all assemblies (e.g., fiber 1-4 secret, fiber 5-8 confidential, and fiber 9-12 public). The sealed network interface unit (NIU) 300 distributes networks to specific locations on the workstation 100. As explained above, the inability of fiber signals to bleed or cross-talk allows multi-network trafficking on the same trunk.

Figure 9:
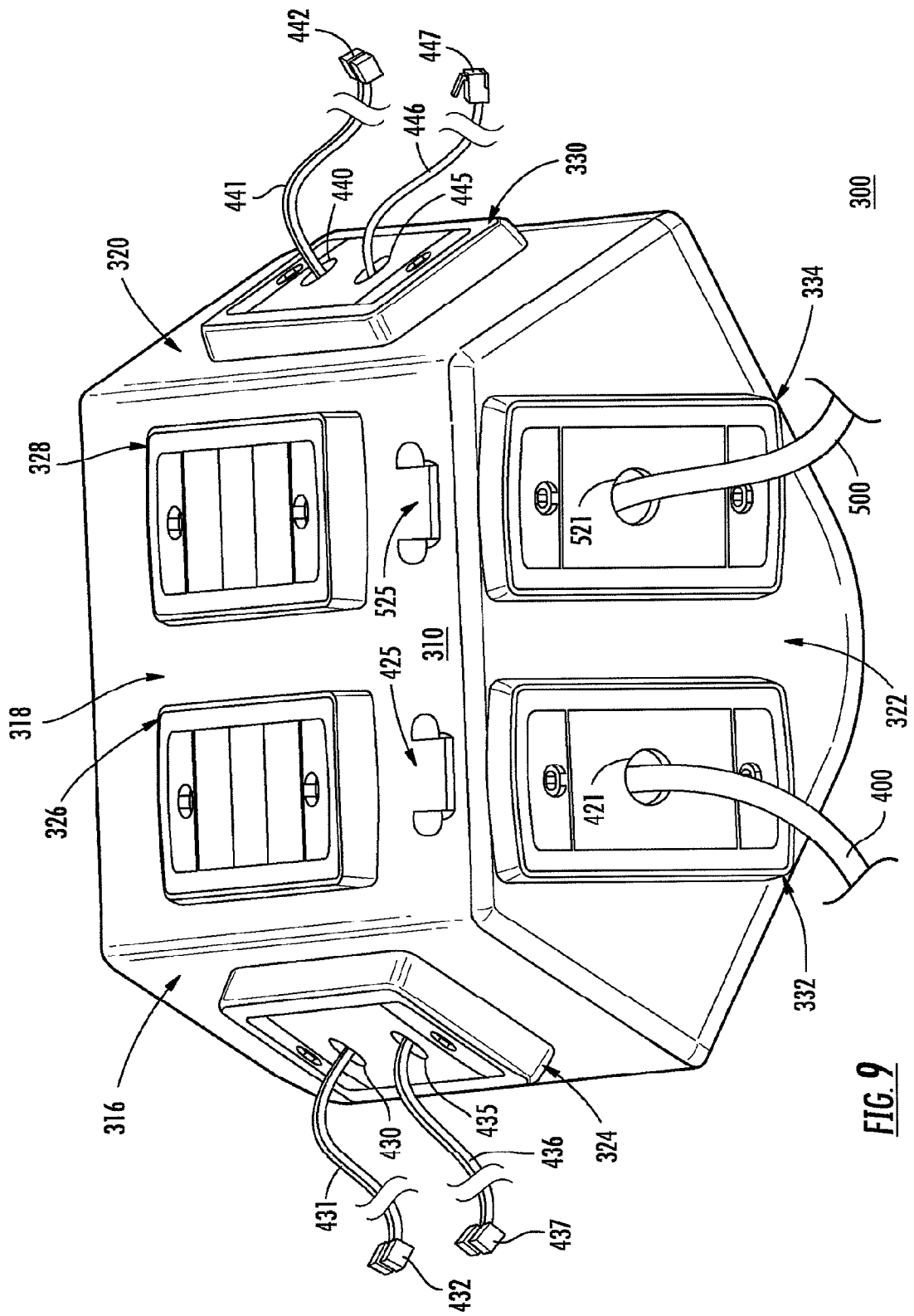
FIG. 9 is a bottom perspective rear view of a network interface unit according to another embodiment of the present invention.

In another exemplary aspect, the NIU 300 may not have the "IN", "THRU", and "OUT" adapters on the lower surface 322 of the NIU 300 for receiving the multi-strand hookup cable, which connects the NIU 300 to a floor-based, wall-based, or ceiling-based hub or distribution network. In this alternative embodiment as illustrated in FIG. 9, the MU 300 may have an access opening 421 or door formed in the lower surface 322 of the NIU 300 for receiving the multi-strand hookup cable 400 into the interior of the NIU 300. In operation, the ends of the multi-strand hookup cable 400 may be inserted into the interior of the NIU 300 and attached directly to the back of the faceplate (e.g., 324, 326, 328, 330) for each network interface, such as the network interface for each CPU or phone. This aspect may reduce costs by reducing or eliminating parts, such as the faceplates on the lower surface 322 of the NIU 300 and one or more of the interior cables of the NIU 300.

In another aspect, the NIU 300 facilitates daisy-chaining a second workstation to a first workstation, a third workstation to the second workstation, and so on, which may reduce the zone hub density. That is, the daisy-chaining of workstations mechanically may reduce the number of, or avoid the need to provide, access points in the floor for every workstation.

Referring again to FIG. 2B, another aspect of the invention provides daisy-chaining a plurality of network interface units (NIUs) 300 of modular workstations 100 together, for example, in a cluster of workstations. More particularly, as explained above, the multi-strand hookup cable 400 may include "IN" fibers 402, "THRU" fibers 404, "IN" copper 406, and/or "THRU" copper 408. Referring to FIGS. 6-8, the "IN" fibers 402 and "THRU" fibers 404 may have multi-fiber connectors that are coupled to the "IN" and "THRU" fiber adapters 360, 362 on the bottom surface of the NIU 300. A multi-fiber connector, such as an MPO connector, may be used to facilitate rapid deployment and reconfiguration of the workstations. Other multi-fiber connectors with a variety of different fiber counts may be used. Similarly, the "IN" copper 406 and "THRU" copper 408 may be coupled to the "IN" and "THRU" RJ45 adapters 370, 372 on the bottom surface 322 of the NIU 300. It is noted that the multi-fiber hookup cable 400 may include any number of fibers, such as 8-fibers, 12-fibers, 24-fibers, . . . , 72-fibers.

Referring to FIGS. 2A-8, in a daisy-chaining aspect, the "THRU" fibers 404 are coupled to the "THRU" adapters 362 on the bottom surface 322 of the NIU 300. Similarly, the "THRU" copper 408 may be coupled to the "THRU" RJ45 adapters 372 on the bottom surface 322 of the NIU 300. The NIU 300 has dedicated "THRU" fibers and "THRU" copper within the NIU 300 that connect the "THRU" fiber adapters 362 and the "THRU" copper adapters 372 on the bottom surface 322 of the NIU 300 to the "OUT" fiber adapters 364 and "OUT" copper adapters 374 on the bottom surface 322 of the NIU 300. A second multi-strand hookup cable 500 may connect the "OUT" fiber adapters 364 and "OUT" copper adapters 374 of the first NIU 300 to "IN" fiber and copper adapters and "THRU" fiber and copper adapters of a second NIU (not shown) of another workstation (not shown), thereby daisy-chaining the first and second workstations together. Alternatively, as illustrated in FIG. 9, the NIU 300 may have another access opening 521 or door formed in the lower surface 322 of the NIU 300 for permitting the second multi-strand hookup cable 500 to exit from the NIU 300 for a daisy-chain connection to a second workstation. The fibers of the first hookup cable 400 intended to supply a downstream workstation would simply pass through the interior of the NIU 300 and exit via the access opening 521 to form the second hookup cable 500. This aspect may reduce costs by reducing or eliminating parts, such as the faceplates on the lower surface 322 of the NIU 300 and one or more of the interior cables of the NIU 300.

As with the cable 400, the second multi-strand hookup cable 500 is not limited to the cable illustrated in FIG. 2B and can include any suitable cable, composite cable, or combination of cables, including, for example, fiber optic and/or copper. For example, aspects of the second cable 500 can include, among other arrangements, a) a collection of cables loosely held together; b) a collection of individual cables wrapped with a loose covering such as "speed-wrap" or the like; and/or c) an overjacketed, composite cable including subunit cables of fiber and copper. Aspects of the second cable 500 also can include a strength member for additional stiffness. The strength member can be disposed, for example, inside the cable or on an exterior of the cable.

The second multi-strand hookup cable 500 may include one or more of "IN" fibers, "THRU" fibers, "IN" copper, and/or "THRU" copper, depending on the configuration of CPU's and telephones at the second workstation. The "IN" fibers and "THRU" fibers of the second multi-strand hookup cable 500 may have multi-fiber connectors that are coupled to the "IN" and "THRU" fiber adapters on the bottom surface of the second NIU. As explained above, a multi-fiber connector, such as an MPO connector, may be used to facilitate rapid deployment and reconfiguration of the workstations. Other multi-fiber connectors with a variety of different fiber counts may be used. Similarly, the "IN" copper and "THRU" copper of the second multi-strand hookup cable 500 may be coupled to the "IN" and "THRU" RJ45 adapters on the bottom surface of the second NIU.

Accordingly, the first NIU 300 may provide dedicated "THRU" fibers and "THRU" copper that pass through to a second NIU, thereby daisy-chaining the first and second workstations together. The second NIU also may be daisy-chained to a third NIU of a third workstation in a similar manner. It is noted that the "THRU" fibers and "THRU" copper are dedicated lines and are not split. It also is noted that the "THRU" cables may include any number of dedicated "THRU" fibers and "THRU" copper, depending on the respective configuration of each down-stream workstation in the daisy-chain. For example, the second workstation may be configured to have three CPU's and no telephone, while the third workstation may be configured to have six CPU's and three telephones. These aspects may reduce the number of floor hubs or floor distribution networks that need to be provided for a given number of workstations. These aspects also may improve the speed and ease with which modular workstations are reconfigured. These aspects also may reduce the complexity of the network wires supplied to the workstations, and more particularly, to a cluster of modular workstations.

FIG. 9 also illustrates that the faceplates 324, 326, 328 and 330 may be modified, as compared to the embodiments illustrated in FIGS. 6-8. In particular, the faceplates no longer hold adapters for the fiber optic networks 1, 2 or 3 or the STP or UTP adapters 348. Rather, the faceplate 234 has first and second access openings 430 and 435 and the faceplate 330 has third and fourth access openings 440 and 445. The faceplates 326 and 328 are blank faceplates with no openings. However, in other embodiments, access openings could be provided in all faceplates in a similar manner.

A first patch cord 431 exits the NIU 300 via the first access opening 430. The first patch cord 431 is directly connected to the fiber optic network 1 inside of the NIU 300 and terminates to a first connector 432 at a distal end, such as an LC type duplex connector where the fiber optic network 1 has transmit and receive channels. A second patch cord 436 exits the NIU 300 via the second access opening 435. The second patch cord 436 is directly connected to the fiber optic network 2 inside of the NIU 300 and terminates to a second connector 437 at a distal end, such as an LC type duplex connector. A third patch cord 441 exits the NIU 300 via the third access opening 440. The third patch cord 441 is directly connected to the fiber optic network 3 inside of the NIU 300 and terminates to a third connector 442 at a distal end, such as an LC type duplex connector. A fourth patch cord 446 exits the NIU 300 via the fourth access opening 445. The fourth patch cord 446 is directly connected to the STP or UTP data network inside of the NIU 300 and terminates to a fourth connector 447 at a distal end, such as an RJ type connector.

The patch cords 431, 436 and 441 may be spliced to the transmit and receive fibers of their respective networks. Alternatively, the fan out or break out within the NIU 300 may be extended in length, such that the patch cords 431, 436 and 441 are sleeved extensions of the fibers (e.g., transmit and receive fibers) within the multi-fiber hookup cable 400 representing their respective network.

This arrangement of FIG. 9 may reduce costs by eliminating parts, such as the adapters on the faceplates and connectors for mating with those adapters. Also, the embodiment of FIG. 9 can offer additional advantages in that the lengths of the first, second, third, and fourth patch cords 431, 436, 441 and 446 may be set to respective predetermined lengths by the manufacturer. The preset lengths of the patch cords can serve as a segregation tool. For example, the first patch cord 431 may provide a connection to the first optic network 1 having a first level of security and the third patch cord 441 may provide a connection to the optic network 3 having a different level of security; and the first patch cord 431 may have a length which is sufficient in length to reach to one device of the workstation (e.g., a red CPU), but is insufficient to reach to other devices (e.g., yellow or green CPUs) of the workstation. Likewise, the third patch cord 441 may have a length which is sufficient to reach to one device of the workstation (e.g., a green CPU), but is insufficient in length to reach to other devices (e.g., red or yellow CPUs) of the workstation.

Optionally, fixed spool guides, such as guides 425 and/or 525 in FIG. 9, may be affixed to the NIU 300 to store any unused or excess cordage relating to elements 431,436, 441, 446, 400 and/or 500. Also, respective automated or self-retracting spools, as known in the background art, could be incorporated inside the NIU 300 for unused or excess cordage relating to elements 431,436, 441, 446, 400 and/or 500.

In another aspect, the NIU 300 may include a power "IN" terminal (not shown) for supplying power to the NIU 300. For example, the power "IN" terminal may be a male plug. The NIU 300 may include power distribution outlets for supplying power to each CPU and/or telephone. The NIU 300 also may include a power "OUT" outlet (not shown) for supplying power to a second NIU of a second workstation, for example, in a daisy-chaining aspect. For example, the power "OUT" terminals may be female power outlets. It is noted that the power distribution lines in the NIU 300 do not need to be dedicated lines and may be split within the NIU 300.

The exemplary aspect of the network illustrated in the Figures is a passive network; e.g., a non-powered network or NIU. However, in another aspect, a non-passive or active network can be provided that is powered. For example, in an aspect, the NIU 300 may include a repeater to boost the signals to one or more NIU's.

The CPUs herein have been illustrated as having fiber connections to networks, and this is the preferred embodiment of the present invention. However, it should be noted that several of the segregation benefits of the present invention could also be achieve in a copper-based system. In other words, it would also be possible for the CPUs to have copper connections to the networks (e.g., via RJ-45 connectors) and still preserve several of the segregation benefits of the present invention. Hence, the entire disclosure about distinguishing the fiber networks from each other via color coding, symbol coding, texture coding, keying, pointing the adapters in a direction toward the intended network device of the workstation to be connected, and providing patch cords of a length which only allow connection between a device and the closest adapter of the NIU, would be equally applicable to connector adapters or ports providing a copper-based connection to the various networks, as opposed to a fiber-based connection to the various networks in the detailed examples above. It is believed the use of the term "adapter" in the appended claims is broad enough to encompass fiber adapters or connectors as well as copper adapters or connectors. Therefore, when the word "adapter" is not used in conjunction with the word "fiber," the word should be interpreted to cover connectors for mediums other than fiber, such as copper mediums.

The present invention has been described herein in terms of several preferred embodiments. However, modifications and additions to these embodiments will become apparent to those of ordinary skill in the art upon a reading of the foregoing description. It is intended that all such modifications and additions comprise a part of the present invention to the extent that they fall within the scope of the several claims appended hereto.

What is claimed is:

1. A network interface unit for a modular workstation, the network interface unit comprising:
   a housing;
   an input on said housing that receives a first multi-fiber cable that is connected to a distribution network;
   a breakout within said housing which separates fibers of said first multi-fiber cable;
   a first workstation output on said housing which directs at least a first fiber of said breakout, representing a first network of said distribution network, to the exterior of said housing; and
   a second workstation output on said housing which directs at least a second fiber of said breakout, representing a second network of said distribution network, to the exterior of said housing, wherein said second network is separate from said first network.

2. The network interface unit according to claim 1, further comprising:
   a third workstation output on said housing which directs at least a third fiber of said breakout, representing a third network of said distribution network, to the exterior of said housing, wherein said first, second and third networks are separate networks each requiring a different respective security level to access.

3. The network interface unit according to claim 1, wherein said first workstation output includes a duplex adapter mounted to said housing, and wherein said at least a first fiber of said breakout includes two fibers representing transmit and receive channels of the first network, and wherein said two fibers are connected to said duplex adapter on the inside of said housing and a patch cord may be connected to said duplex adapter on the outside of said housing.

4. The network interface unit according to claim 1, wherein said first workstation output includes a first through hole in said housing, and wherein said first fiber of said breakout passes through said first through hole to the outside of said housing and terminates to a first connector.

5. The network interface unit according to claim 1, wherein said input on said housing also receives a second multi-fiber cable that is connected to the distribution network, and further comprising:
   a daisy chain output on said housing which directs said second multi-fiber cable, representing the distribution network, to the exterior of said housing.

6. The network interface unit according to claim 5, wherein said input includes first and second adapters mounted to said housing, wherein said first adapter receives a connector of the first multi-fiber cable and said break out is connected to said first adapter on the inside of said housing; and wherein said second adapter receives a connector of the second multi-fiber cable and is also connected to a jumper multi-fiber cable on the inside of said housing.

7. The network interface unit according to claim 6, wherein said daisy chain output includes a third adapter mounted to said housing, wherein said jumper multi-fiber cable is connected to said third adapter on the inside of said housing and a multi-fiber patch cord may be connected to said third adapter on the outside of said housing to daisy chain the distribution network to another workstation.

8. A network interface unit for a modular workstation, the network interface unit comprising:
   a housing;
   an input network adapter on said housing that receives an input connector of a first cable that is connected to a distribution network;
   a first workstation adapter on said housing that receives a first connector of a second cable that is connected to a first device of the workstation; and
   a second workstation adapter on said housing that receives a second connector of a third cable that is connected to a second device of the workstation, wherein said first workstation adapter is distinguished from said second workstation adapter visually or physically so as to correspond to a level of security of a network connected to said first or second workstation adapter.

9. The network interface unit according to claim 8, wherein said first workstation adapter is distinguished from said second workstation adapter by a color, symbol or texture.

10. The network interface unit according to claim 8, wherein said first workstation adapter is distinguished from said second workstation adapter by a different physical structure to which a mating connector must complimentarily match in order to mate.

11. The network interface unit according to claim 10, wherein the different physical structure represents a different type of connector.

12. The network interface unit according to claim 11, wherein said first workstation adapter is an LC class adapter and wherein said second workstation adapter is one of an SC or ST class adapter.

13. The network interface unit according to claim 10, wherein the different physical structure represents a different keying structure on a same class of adapter.

14. The network interface unit according to claim 13, wherein the said first workstation adapter is an LC class adapter having a first keying sequence and wherein said second workstation adapter is an LC adapter having a second keying sequence different from said first keying sequence.

15. The network interface unit according to claim 8, wherein said first cable is a first multi-fiber cable, and further comprising:
 a throughput network adapter on said housing that receives a throughput connector of the first multi-fiber cable that is connected to the distribution network;
 an output network adapter on said housing that receives a connector of a second multi-fiber cable that is connected to another workstation; and
 a third multi-fiber cable having a first end that is connected to said throughput network adapter and a second end connected to said output network adapter.

16. The network interface unit according to claim 15, wherein said housing includes a plurality of faces, wherein said input network adapter and said output network adapter are located on a first face of said housing which faces downwardly, wherein said first workstation adapter is located on a second face of said plurality of faces of said housing which faces to a first lateral direction; and wherein said second workstation adapter is located on a third face of said plurality of faces of said housing which faces to a different second lateral direction.

17. A network interface unit for a modular workstation, the network interface unit comprising:
 a housing;
 an input network adapter on said housing that receives an input connector of a first cable that is connected to a distribution network;
 a first workstation adapter on said housing;
 a second cable having a first connector at one end connected to a first device supported by the workstation and a second connector at an opposite end connected to said first workstation adapter;
 a second workstation adapter on said housing; and
 a third cable having a third connector at one end connected to a second device supported by the workstation and a fourth connector at an opposite end connected to said second workstation adapter;
 wherein said first workstation adapter provides a connection to a first network having a first level of security and said second workstation adapter provides a connection to a second network having a second level of security; and
 wherein said second cable has a length which is sufficient to form a connection between said first device and said first workstation adapter, but is insufficient to form a connection between said first device and said second workstation adapter.

18. The network interface unit according to claim 17, wherein said third cable has a length which is sufficient to form a connection between said second device and said second workstation adapter, but is insufficient to form a connection between said second device and said first workstation adapter.

19. The network interface unit according to claim 17, wherein said first workstation adapter is on a first face of said housing which faces in the direction of said first device; and said second workstation adapter is on a second face of said housing which faces in the direction of said second device.

20. The network interface unit according to claim 18, wherein said housing includes a plurality of faces, wherein said input network adapter and said output network adapter are located on a first face of said housing which faces downwardly, wherein said first workstation adapter is located on a second face of said plurality of faces of said housing which faces to a first lateral direction; and wherein said second workstation adapter is located on a third face of said plurality of faces of said housing which faces to a second lateral direction.

* * * * *